US008934916B2

(12) United States Patent
Pan et al.

(10) Patent No.: US 8,934,916 B2
(45) Date of Patent: Jan. 13, 2015

(54) METHOD AND DEVICE FOR CONFIGURING DOWNLINK SCHEDULING INFORMATION

(75) Inventors: Xueming Pan, Beijing (CN); Zukang Shen, Beijing (CN); Guojun Xiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 322 days.

(21) Appl. No.: 13/499,262

(22) PCT Filed: Sep. 20, 2010

(86) PCT No.: PCT/CN2010/077140
§ 371 (c)(1),
(2), (4) Date: Mar. 29, 2012

(87) PCT Pub. No.: WO2011/038649
PCT Pub. Date: Apr. 7, 2011

(65) Prior Publication Data
US 2012/0190395 A1 Jul. 26, 2012

(30) Foreign Application Priority Data
Sep. 29, 2009 (CN) .......................... 2009 1 0235253

(51) Int. Cl.
*H04W 72/00* (2009.01)
*H04L 5/00* (2006.01)
*H04W 72/12* (2009.01)
*H04W 24/10* (2009.01)

(52) U.S. Cl.
CPC .............. *H04L 5/001* (2013.01); *H04L 5/0053* (2013.01); *H04L 5/006* (2013.01); *H04L 5/0064* (2013.01); *H04L 5/0094* (2013.01); *H04L 5/0098* (2013.01); *H04W 72/1226* (2013.01); *H04W 24/10* (2013.01)
USPC ......................................... 455/450; 455/443

(58) Field of Classification Search
USPC .......................... 455/450, 452.1, 452.2, 456.2
See application file for complete search history.

(56) References Cited

U.S. PATENT DOCUMENTS

2009/0088148 A1* 4/2009 Chung et al. ................... 455/423
2010/0279628 A1* 11/2010 Love et al. ....................... 455/70

FOREIGN PATENT DOCUMENTS

| CN | 101389106 A | 3/2009 |
| CN | 101505498 A | 8/2009 |
| WO | WO 2009/095369 A1 | 8/2009 |

OTHER PUBLICATIONS

PCT International Search Report for PCT Counterpart Application No. PCT/CN2010/077140 containing Communication relating to the Results of the International Search Report, 6 pgs., (Dec. 30, 2010).

(Continued)

*Primary Examiner* — Tu X Nguyen
(74) *Attorney, Agent, or Firm* — Blakely, Sokoloff, Taylor & Zafman LLP (57) ABSTRACT

A method and apparatus for configuring downlink scheduling information are used to control times of blind detection in multi-carrier system. The method includes that: a downlink carrier set and an uplink carrier set are allocated to a terminal which sends a service request; according to the bandwidth information of each carrier of the system, obtained terminal type information, currently received channel quality information fed back from the terminal, transmission modes which are allocated to each member carrier in the downlink carrier set and the uplink carrier set and determined carrier scheduling modes of the terminal, at least one member carrier in the downlink carrier set is selected as a member carrier of Physical Downlink Control Channel (PDCCH) activation carrier set; the times of PDCCH blind detection can not exceed the each sub frame maximum blind detection times supported by the terminal in the terminal type information, wherein the PDCCH blind detection is used for uplink and downlink scheduling, and the PDCCH activation carrier set is used to be provided for the terminal to perform the PDCCH blind detection.

16 Claims, 3 Drawing Sheets

(56) References Cited

OTHER PUBLICATIONS

Catt, "Issues on Cross Carrier Scheduling", 3GPP TSG RAN WG1 Meeting #58, Draft No. R1-093531, Shenzhen, China, 3 pages., (Aug. 24-28, 2009).

CMCC, "Resource Allocation and PDCCH Design Issues in Carrier Aggregation", 3GPP TSG-RAN WG1 #56, Draft No. R1-090924, Athens, Greece, 6 pages, (Feb. 9-13, 2009).

Catt, et al., "Design of DL Control Channel for LTE-A with Carrier Aggregation", 3GPP TSG RAN WG1 Meeting #58, Draft No. R1-093530, Shenzhen, China, 4 pages, (Aug. 24-28, 2009).

Alcatel-Lucent, "Component Carrier Indication for Bandwidth Extension in LTE-A", 3GPP TSG-RAN WG1 #58, Draft No. R1-093362, Shenzhen, China, 5 pages, (Aug. 24-28, 2009).

Catt, "Analysis of PDCCH Monitoring Component Carrier Set on LTE-A", 3GPP TSG RAN WG1 Meeting #59, Draft No. R1-094537, Jeju, Korea, 4 pages, (Nov. 9-13, 2009).

Samsung, "Configuration of PDCCH Candidate Sets for the Control of Blind Decoding Attempts", 3GPP TSG RAN WG1 Meeting #52, Draft No. R1-080675, Sorrento, Italy, 5 pages, (Feb. 11-15, 2008).

\* cited by examiner

METHOD AND DEVICE FOR CONFIGURING DOWNLINK SCHEDULING INFORMATION

CROSS-REFERENCE TO RELATED APPLICATIONS

This application is a US National Stage of International Application No. PCT/CN2010/077140, filed on Sep. 20, 2010, designating the United States, and claiming priority to Chinese Patent Application No. 200910235253.6, filed with the State Intellectual Property Office of China on Sep. 29, 2009 and entitled "Method and device for configuring downlink scheduling information", which is hereby incorporated by reference in its entirety.

FIELD OF THE INVENTION

The present invention relates to the field of communications and particularly to a method and device for configuring downlink scheduling information.

BACKGROUND OF THE INVENTION

In a Long Term Evolution (LTE) system, a User Equipment (UE) has to perform blind detection for a Physical Downlink Control Channel (PDCCH) simultaneously in a common search space and a UE-specific search space, and an aggregation level of Control Channel Elements (CCEs) for the PDCCH may be 1, 2, 4 or 8. The number of PDCCH candidates to be detected blindly may vary from one aggregation level of CCEs from another, and reference is made to Table 1 depicting the description, given in the $3^{rd}$ Generation Partnership Project (3GPP) TS36.213 Section 9.1.1, of PDCCH candidates monitored by the UE.

TABLE 1

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Furthermore, blind detection has to be performed for two formats of Downlink Control Information (DCI) for each transmission mode, and the different DCI formats are distinguished with their lengths. A largest number 44 of blind detections including a number 12 of ones in the common search space and a number 32 of ones in the UE-specific search space are performed at the user equipment for a DCI format at a different aggregation level. In an R8 system, the length of bits in a DCI format varies with a different bandwidth of the system, and the UE knows the size of the bandwidth of the system while performing blind detection for the DCI format, so that the number of blind detections will not be increased due to the different bandwidth of the system. Moreover in the R8 system, the UE has to perform blind detection for different DCI formats in different transmission modes, which has been defined particularly in the protocol 36.213. A specific specification is as follows taking a Cell Radio Network Temporary Identity (C-RNTI) as an example.

For a Long Term Evolution-Advanced (LTE-A) system, resources of a plurality of LTE carriers (also referred to as component carriers) have to be linked in use so as to support a wider system bandwidth, e.g., 100 MHz, etc., than the LTE system, and particularly a plurality of consecutive LTE carriers are aggregated to provide the LTE-A system with a larger transmission bandwidth or a plurality of inconsecutive LTE carriers are aggregated to provide the LTE-A system with a larger transmission bandwidth.

A study of the standardization organization exhibits such an ongoing trend that it has been commonly recognized to design a system with carrier aggregation by making a design over each carrier as consistent with the LTE R8 as possible to thereby ensure that the LTE R8 user equipment can operate normally over each component carrier.

As currently discussed about the standard of the LTE-A, there are the following two candidate schemes for a physical downlink control channel design of a system with carrier aggregation taking into account the complexity of the PDCCH design, the flexibility of scheduling and the condition of asymmetric carrier aggregation in the uplink and the downlink.

Figure 1:
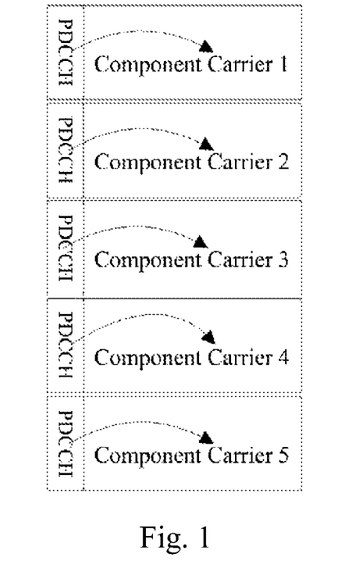
FIG. 1 is a schematic diagram of intra-carrier scheduling in a multi-carrier system.

In a first scheme as illustrated in FIG. 1, a PDCCH is transmitted separately over each carrier, and a physical resource of only the present carrier can be scheduled over the PDCCH, which is also referred to as intra-carrier scheduling.

Figure 2:
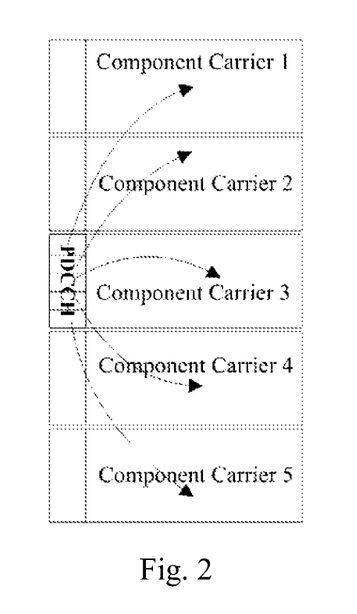
FIG. 2 is a schematic diagram of across-carrier scheduling in a multi-carrier system.

In a second scheme as illustrated in FIG. 2, a plurality of carrier resources are scheduled over a plurality of separate PDCCHs borne over one or more carriers, and this scheme is an improvement to the first scheme. In this case, a resource of only one carrier can be scheduled over each PDCCH, and for example, a plurality of PDCCHs are borne over one carrier, that is, a plurality of carrier resources are scheduled over a plurality of separate PDCCHs borne over a specific carrier, which is also referred to as across-carrier scheduling.

In the second scheme, it has been accepted in the existing standard to add a 1 to 3-bit Carrier Indicator to the original R8 scheduling signalling format to indicate which component carrier has a physical resource scheduled by this scheduling signalling, and it has been accepted in the discussion about the standard to allocate a UE Downlink Component Carrier Set (UE DL CC Set) to the UE in a specific signalling so that the UE can receive downlink data over a DL CC in the set. As suggested in some proposed schemes, a PDCCH Active CC Set is further defined, and the UE has to perform blind detection for a PDCCH in this set. What is illustrated in FIG. 2 can be taken as a case of UE DL CC Set={CC1, CC2, CC3, CC4, CC5} and PDCCH Active Set={CC3}.

Based on the foregoing first scheme, the UE has to perform blind detection similar to the R8 separately over each carrier, that is, there are a number 44 of blind detections over each carrier of each sub-frame, thus resulting in a total number 44*5=220 without taking into account an increased number of blind detections due to other new characteristics of the LTE-A, and as can be apparent, the capacity of the LTE-A UE is highly required.

Based on the foregoing second scheme, if the component carriers are provided with the same bandwidth and transmission mode, the number of blind detections by the UE, when allocating only one carrier as a PDCCH bearer carrier (as illustrated in FIG. 2), can be controlled to be the same as in the case for the R8, that is, there are a number 44 of blind detections in each sub-frame without taking into account an increased number of blind detections due to other new characteristics of the LTE-A.

Based on the foregoing second scheme, if there are different transmission bandwidths for the respective component carriers, the UE has to perform a total number 44*5=220 of blind detections in a sub-frame in the case illustrated in FIG. 2 because the length of bits in the same DCI format varies with the different transmission bandwidths. Different transmission modes are possible for each component carrier, and there may be a further increased number of blind detections by the UE, thus resulting in a number up to 44*5*5=1100 of blind detections.

Based on the second scheme, there may be also a further increased number of blind detections if the UE is configured with more than one PDCCH carriers.

Therefore, based on the second scheme, the number of blind detections by the UE may be increased unacceptably if there is no restraint for scheduling the UE DL CC Set and the PDCCH Active CC Set, and this may be adverse to both the cost of implementing the UE and the scheduling in the system.

In summary, the blind detection method is adopted for a downlink control channel in the LTE system, that is, the UE decodes a downlink control channel in each sub-frame by making a number of attempts on different resource locations of the control channel, different coding rates of the control channel and different formats of control signalling until correct control signalling is decoded correctly. The R8 UE has a specified capacity of a number 44 of blind detections in a sub-frame, and this blind detection capacity depends upon the complexity and cost of implementing the user equipment.

In the LTE-A system, various transmission modes can be defined in the downlink thanks to enhanced multi-antenna and transmission technologies so that various new formats of control signalling have emerged inevitably, and various uplink transmission modes, each of which may correspond to different formats of uplink scheduling signalling, can be defined in the system also in the uplink thanks to introduction of the multi-antenna technology, a result of which may be a larger number of blind detections to be supported by the LTE-A user equipment. Furthermore, the number of blind detections by the user equipment may be further increased due to introduction of carrier aggregation and separately encoded control signalling of each carrier. Therefore, it is an issue under consideration to control the number of blind detections.

SUMMARY OF THE INVENTION

The invention provides a method and device for configuring downlink scheduling information to control the number of blind detections in a system with multi-carrier aggregation.

An embodiment of the invention provides a method for configuring downlink scheduling information, which includes:

allocating a downlink component carrier set and an uplink component carrier set to a user equipment transmitting a service request; and selecting at least one component carrier from the downlink component carrier set as a component carrier in a PDCCH active component carrier set according to bandwidth information of respective carriers in a system, acquired type information of the user equipment, currently received channel quality information fed back from the user equipment, transmission modes allocated to respective component carriers in the downlink component carrier set and the uplink component carrier set, and a determined carrier scheduling mode of the user equipment, wherein the user equipment performs PDCCH blind detections for uplink and downlink scheduling in the PDCCH active component carrier set for a number of times which does not exceed the largest number of blind detections per sub-frame supported by the user equipment in the type information of the user equipment.

An embodiment of the invention provides a device for configuring downlink scheduling information, which includes:

a carrier allocating unit configured to allocate a downlink component carrier set and an uplink component carrier set to a user equipment according to currently received channel quality information fed back from the user equipment, acquired type information of the user equipment and a service request of the user equipment; and a PDCCH active carrier allocating unit configured to select at least one component carrier from the downlink component carrier set as a component carrier in a PDCCH active component carrier set according to bandwidth information of respective carriers in a system, the acquired type information of the user equipment, the currently received channel quality information fed back from the user equipment, transmission modes allocated to respective component carriers in the downlink component carrier set and the uplink component carrier set, and a determined carrier scheduling mode of the user equipment, and the PDCCH active component carrier set is provided for the user equipment to perform PDCCH blind detections for uplink and downlink scheduling for a number of times which does not exceed the largest number of blind detections per sub-frame supported by the user equipment in the type information of the user equipment.

In the embodiments of the invention, it is possible to select at least one component carrier from the downlink component carrier set as a component carrier in the PDCCH active component carrier set according to the bandwidth information of the respective carriers in the system, the acquired type information of the user equipment, the currently received channel quality information fed back from the user equipment, the transmission modes allocated to the respective component carriers in the downlink component carrier set and the uplink component carrier set, and the determined carrier scheduling mode of the user equipment, and the user equipment performs PDCCH blind detections in the PDCCH active component carrier set for a number of times which does not exceed the largest number of blind detections per sub-frame supported by the user equipment in the type information of the user equipment to thereby control the number of blind detections.

DETAILED DESCRIPTION OF THE EMBODIMENTS

Figure 3:
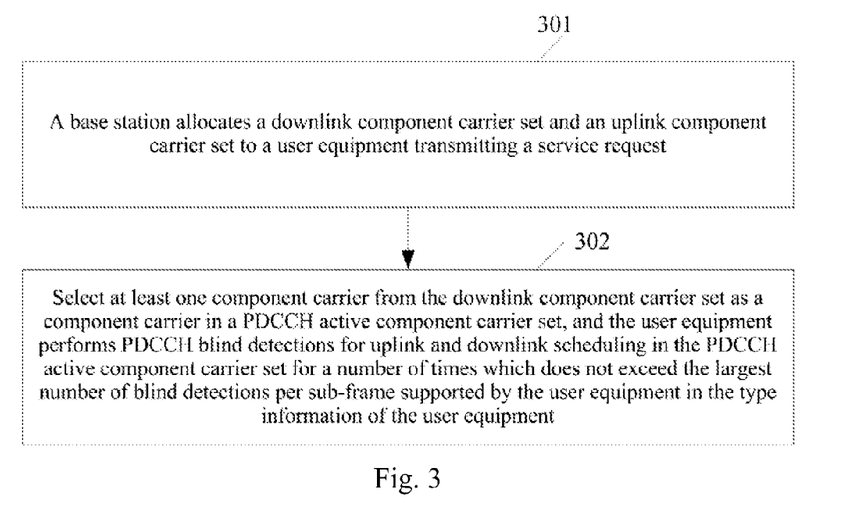
FIG. 3 is a schematic flow chart of a method for configuring downlink scheduling information according to an embodiment of the invention.

Referring to FIG. 3, a method for configuring downlink scheduling information according to an embodiment of the invention includes the following operations:

Operation 301: A base station allocates a downlink component carrier set and an uplink component carrier set to a user equipment transmitting a service request.

Here the base station allocates the downlink component carrier set to the user equipment according to currently received channel quality information fed back from the user equipment, acquired type information of the user equipment and the service request of the user equipment. The base station may allocate the uplink component carrier set to the user equipment according to a received uplink channel measurement result of the user equipment, the acquired type information of the user equipment and an uplink service request of the user equipment. Alternatively, the base station may allocate directly an uplink component carrier set including one or more uplink sub-carriers according to the acquired type information of the user equipment and an uplink service request.

Here the base station can acquire the type information of the user equipment by receiving a Radio Resource Control (RRC) message during an access of the user equipment, and particularly the type information of the user equipment can be acquired explicitly or implicitly.

Operation 302: At least one component carrier is selected from the downlink component carrier set as a component carrier in a PDCCH Active component carrier set according to bandwidth information of respective carriers of a system, acquired type information of the user equipment, currently received channel quality information fed back from the user equipment, transmission modes allocated to respective component carriers in the downlink component carrier set and the uplink component carrier set, and a determined carrier scheduling mode of the user equipment, and the user equipment performs blind detection for uplink and downlink scheduling PDCCHs in the PDCCH active component carrier set for a number of times which does not exceed the largest number of blind detections per sub-frame supported by the user equipment in the type information of the user equipment.

In the operation 302, the transmission modes are allocated to the respective component carriers in the downlink component carrier set according to the currently received channel quality information fed back from the user equipment.

In the operation 302, the transmission modes are allocated to the respective component carriers in the uplink component carrier set according to uplink channel quality information currently measured by the user equipment.

In the operation 302, a downlink carrier scheduling mode of the user equipment is determined according to the currently received channel quality information fed back from the user equipment and current interference level information of the system.

In the operation 302, the downlink carrier scheduling mode of the user equipment is determined as follows:

a level of the user equipment is determined according to the type information of the user equipment; and the downlink carrier scheduling mode of the user equipment is determined according to the determined level of the user equipment, the currently received channel quality information fed back from the user equipment and the current interference level information of the system.

The base station acquires the type information of the user equipment by receiving an RRC message during an access of the user equipment.

In the operation 302, the uplink carrier scheduling mode of the user equipment is determined according to the currently received channel quality information fed back from the user equipment and the current interference level information of the system.

In the operation 302, the uplink carrier scheduling mode of the user equipment can be determined as follows:

the level of the user equipment is determined according to the type information of the user equipment; and the carrier scheduling mode of the user equipment is determined according to the determined level of the user equipment, the currently received channel quality information fed back from the user equipment and the current interference level information of the system.

In an implementation, the operation 302 can be performed as follows:

B11. A number N of component carriers with the highest channel quality in the downlink component carrier set are taken as component carriers in the PDCCH active component carrier set, where N is a natural number and not larger than the number of component carriers in the downlink component carrier set;

B12. A downlink carrier scheduling mode of the user equipment and the number of component carriers included in the PDCCH active component carrier set are determined according to the bandwidth information of the respective carriers in the system, the type information of the user equipment, the currently received channel quality information fed back from the user equipment, and the transmission modes allocated to the respective component carriers in the downlink component carrier set; and an uplink carrier scheduling mode of the user equipment is determined according to the bandwidth information of the respective uplink carriers in the system, the type information of the user equipment, a currently received uplink channel measurement result of the user equipment, and the transmission modes allocated to the respective component carriers in the uplink component carrier set; and B13. The number of PDCCH blind detections performed by the user equipment for uplink and downlink scheduling in the PDCCH active component carrier set is calculated, it is determined whether the number of PDCCH blind detections exceeds the largest number of blind detections per sub-frame supported by the user equipment in the type information of the user equipment, and if not, the PDCCH active component carrier set is allocated to the user equipment; otherwise, a number N-M of component carriers are selected from the downlink component carrier set as component carriers in the PDCCH active component carrier set, where M is a smaller natural number than N, and the calculation is continued with (that is, the operation B13 is repeated).

M can be a fixed value preset for all the user equipments or a value preset for the largest number of blind detections per sub-frame supported by the user equipment.

In another implementation, the operation 302 can be performed as follows:

B20. The level of the user equipment is determined according to the type information of the user equipment, and the number of downlink component carriers corresponding to the determined level of the user equipment is acquired according to a preset correspondence relationship between the levels of the user equipment and the supported largest numbers of downlink component carriers;

B21. Downlink component carriers, the number of which is smaller than the largest number of downlink component carriers, are selected from the downlink component carrier set;

B22. The carrier scheduling mode of the user equipment and the number of component carriers included in the PDCCH active component carrier set are determined according to the bandwidth information of the respective carriers in the system, the type information of the user equipment, the currently received channel quality information fed back from the user equipment, and the transmission modes allocated to the respective component carriers in the downlink component carrier set; and an uplink carrier scheduling mode of the user equipment is determined according to the bandwidth information of the respective uplink carriers in the system, the type information of the user equipment, a currently received uplink channel measurement result of the user equipment, the number of component carriers included in the PDCCH active component carrier set, and the transmission modes allocated to the respective component carriers in the uplink component carrier set; and B23. The number of PDCCH blind detections performed by the user equipment for uplink and downlink scheduling in the PDCCH active component carrier set is calculated, it is determined whether the number of blind detections exceeds the largest number of blind detections per sub-frame supported by the user equipment in the type information of the user equipment, and if not, the PDCCH active component carrier set is allocated to the user equipment; otherwise, component carriers, the number of which is dependent upon the number of component carriers in the PDCCH active component carrier set corresponding to the next level of the user equipment, are selected from the downlink component carrier set as the PDCCH active component carrier set, and the calculation is continued with (that is, the operation B23 is repeated).

The technical solution of the invention will be detailed below in a particular embodiment.

In the embodiment of the invention, a user equipment is configured with a UE Downlink Component Carrier (DL CC) Set and a PDCCH Active Component Carrier (CC) Set according to the largest number of blind detection per sub-frame supported by the user equipment.

A reasonable design in an LTE-A system is to define different levels of user equipment types in view of a proportional relationship of the number of blind detections per sub-frame of a user equipment and the number of aggregated carries supported by the user equipment with a baseband processing capacity of the user equipment and the cost of the user equipment. A user equipment at a lower level supports only a smaller number of component carriers for aggregation (and even a single carrier) and a smaller number of blind detections per sub-frame, and a user equipment at a higher level supports a larger number of component carriers for aggregation and a larger number of blind detections per sub-frame.

For example, if a user equipment at a specific level supports a largest number N of aggregated component carriers and a largest number M of blind detections per sub-frame, a base station allocates to the user equipment a UE DL CC Set including a largest number N of component carriers; and if there are different carrier bandwidths and transmission modes in the system, a PDCCH active component carrier set shall be scheduled for the user equipment under the following principle.

If the user equipment performs a number K of blind detections per sub-frame over a component carrier in a transmission mode as in the scheduling mode of the first scheme in a design of the LTE-A system, a number N of component carriers scheduled for the user equipment are provided with carrier resources with a number A of different bandwidths ($1 \leq A \leq N$) and a number B ($1 \leq B \leq N$) of different transmission modes, and a PDCCH active component carrier set scheduled for the user equipment includes a number C ($1 \leq C \leq N$) of component carriers, then the following relationship shall be satisfied:

$$K*A*B*C \leq M$$

Furthermore, the PDCCH active component carrier set shall be included in or be equivalent to the UE DL CC Set so that the user equipment can operate over as least bandwidths as possible.

For example, if the user equipment supports a number N=2 of CCs and a designed capacity of a number M=88 of blind detections per sub-frame, and there is an aggregation of two CCs, where CC1 with a bandwidth of 20M and CC2 with a bandwidth of 5M, then the following configurations are allowed:

1) A downlink component carrier set=CC1 and CC2, a PDCCH active component carrier set=CC1, and the second scheme, i.e., across-carrier scheduling;

2) A downlink component carrier set=CC 1 and CC2, a PDCCH active component carrier set=CC2, and the second scheme;

3) A downlink component carrier set=CC1 and CC2, a PDCCH active component carrier set=CC1 and CC2, and the first scheme, i.e., intra-carrier scheduling;

4) A downlink component carrier set=CC1, a PDCCH active component carrier set=CC1, and the first scheme; and 5) A downlink component carrier set=CC2, a PDCCH active component carrier set=CC2, and the first scheme.

The following configurations are disallowed:

1) A downlink component carrier set=CC1, a PDCCH active component carrier set=CC2, and the second scheme (unreasonable configuration);

2) A downlink component carrier set=CC2, a PDCCH active component carrier set=CC1, and the second scheme (unreasonable configuration); and 3) A downlink component carrier set=CC1 and CC2, a PDCCH active component carrier set=CC1 and CC2, and the second scheme (beyond the designed capacity of a number of blind detections).

Figure 4:
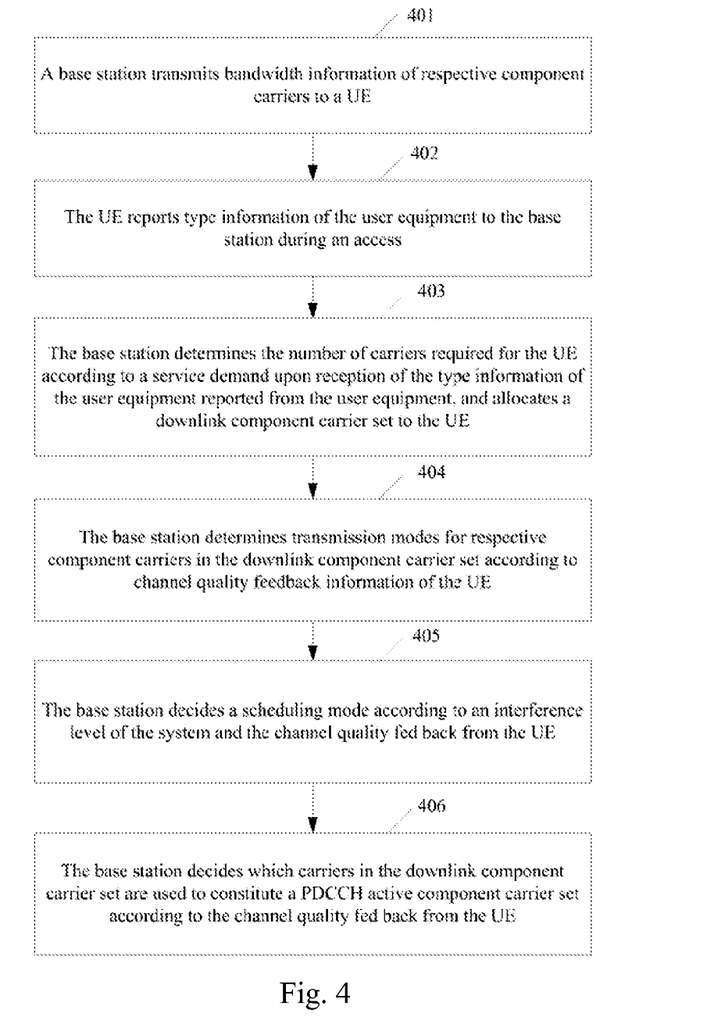
FIG. 4 is a schematic flow chart of a particular implementation of the method according to an embodiment of the invention.

Referring to FIG. 4, a process of the method of the invention in a particular embodiment is as follows.

Operation 401: A base station transmits bandwidth information of respective component carriers to a user equipment, for example, through cell broadcast.

Operation 402: The user equipment reports type information of the user equipment, including the largest number of operating carriers and the largest number of blind detections per sub-frame supported by the user equipment, to the base station during an access.

Here the largest number of operating carriers and the largest number of blind detections per sub-frame supported by the user equipment can be reported implicitly in the type information of the user equipment or reported in separate signalling.

Operation 403: The base station determines the number of carriers required for transmission from the user equipment, which does not exceed the maximum operating capacity of the user equipment, according to a service demand upon reception of the type information of the user equipment reported from the user equipment, and allocates a downlink component carrier set to the user equipment.

Here the base station allocates the downlink component carrier set to the user equipment according to channel qualities fed back from the user equipment, a load and a scheduling condition in a system, etc., and notifies it to the user equipment in user equipment-specific high layer signalling.

Operation 404: The base station determines transmission modes for respective component carriers in the downlink component carrier set allocated in the operation 403 according to channel quality feedback information of the user equipment.

Operation 405: The base station decides a scheduling mode of intra-carrier scheduling or across-carrier scheduling for the user equipment according to an interference level of the system and the channel qualities fed back from the user equipment, and notifies the user equipment of the result of decision in user equipment-specific high layer signalling.

Operation 406: The base station decides which carriers, for example, carriers with a higher channel quality, in the downlink component carrier set are used to constitute a PDCCH active component carrier set according to the channel qualities fed back from the user equipment. Furthermore, the number of blind detections is calculated according to the bandwidth information of the respective carriers in the system, the type information of the user equipment, the currently received channel quality information fed back from the user equipment, the transmission modes allocated to the respective component carriers in the downlink component carrier set, the determined carrier scheduling mode of the user equipment, and the number of component carriers included in the PDCCH active component carrier set, it is determined whether the number of blind detections exceeds the largest number of blind detections per sub-frame of the user equipment, and if so, carriers are reselected to constitute the PDCCH active component carrier set, and the final result of selection is transmitted to the user equipment in user equipment-specific signalling.

Based upon the same concept of the invention, an embodiment of the invention further provides a device for configuring downlink scheduling information, and the principle under which the problem is addressed by the device is similar to that of the method for configuring downlink scheduling information, so reference can be made to the implementation of the method for an implementation of the device, a repeated description of which will be omitted here.

Figure 5:
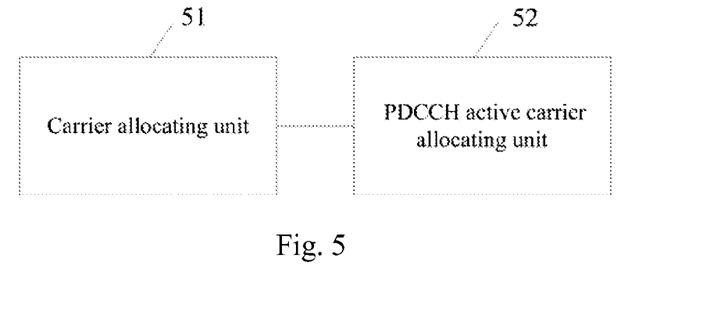
FIG. 5 is a schematic structural diagram of a device for configuring downlink scheduling information according to an embodiment of the invention.

Referring to FIG. 5, a device for configuring downlink scheduling information according to an embodiment of the invention includes:

a carrier allocating unit 51 configured to allocate a downlink component carrier set and an uplink component carrier to a user equipment according to currently received channel quality information fed back from the user equipment, acquired type information of the user equipment and a service request of the user equipment; and a PDCCH active carrier allocating unit 52 configured to select at least one component carrier from the downlink component carrier set as a component carrier in a PDCCH active component carrier set according to bandwidth information of respective carriers in a system, the acquired type information of the user equipment, the currently received channel quality information fed back from the user equipment, transmission modes allocated to respective component carriers in the downlink component carrier set and the uplink component carrier set, and a determined carrier scheduling mode of the user equipment, and the PDCCH active component carrier set is provided for the user equipment to perform a number of PDCCH blind detections for uplink and downlink scheduling, which does not exceed the largest number of blind detections per sub-frame supported by the user equipment in the type information of the user equipment.

The PDCCH active carrier allocating unit 52 is configured to take a number N of component carriers with the highest quality in the downlink component carrier set as component carriers in the PDCCH active component carrier set, where N is a natural number and not larger than the number of component carriers in the downlink component carrier set; to determine a downlink carrier scheduling mode of the user equipment according to the bandwidth information of the respective carriers in the system, the type information of the user equipment, the currently received channel quality information fed back from the user equipment, and the transmission modes allocated to the respective component carriers in the downlink component carrier set; to determine an uplink carrier scheduling mode of the user equipment according to the bandwidth information of the respective uplink carriers in the system, the type information of the user equipment, a currently received uplink channel measurement result of the user equipment, the number of component carriers included in the PDCCH active component carrier set, and the transmission modes allocated to the respective component carriers in the uplink component carrier set; and to determine the number of component carriers included in the PDCCH active component carrier set, calculate the number of PDCCH blind detections performed by the user equipment for uplink and downlink scheduling in the PDCCH active component carrier set, determine whether the number of PDCCH blind detections exceeds the largest number of blind detections per sub-frame supported by the user equipment in the type information of the user equipment, and if not, allocate the PDCCH active component carrier set to the user equipment; otherwise, select a number N-M of component carriers from the downlink component carrier set as component carriers in the PDCCH active component carrier set, where M is a smaller natural number than N, and perform the calculation again. M is a fixed value preset for all the user equipments or a value preset for the largest number of blind detections per sub-frame supported by the user equipment.

The PDCCH active carrier allocating unit 52 is configured to determine the level of the user equipment according to the type information of the user equipment, and acquire the number of downlink component carriers corresponding to the determined level of the user equipment according to a preset correspondence relationship between the levels of the user equipment and the supported largest numbers of downlink component carriers; to select downlink component carriers, the number of which is smaller than the largest number of downlink component carriers, from the downlink component carrier set; to determine the carrier scheduling mode of the user equipment and the number of component carriers included in the PDCCH active component carrier set according to the bandwidth information of the respective carriers in the system, the type information of the user equipment, the currently received channel quality information fed back from the user equipment, and the transmission modes allocated to the respective component carriers in the downlink component carrier set, and determine an uplink carrier scheduling mode of the user equipment according to the bandwidth information of the respective uplink carriers in the system, the type information of the user equipment, a currently received uplink channel measurement result of the user equipment, the number of component carriers included in the PDCCH active component carrier set, and the transmission modes allocated to the respective component carriers in the uplink component carrier set; and calculate the number of blind detections performed by the user equipment in the PDCCH active component carrier set, determine whether the number of blind detections exceeds the largest number of blind detections per sub-frame supported by the user equipment in the type information of the user equipment, and if not, allocate the PDCCH active component carrier set to the user equipment; otherwise, select component carriers, the number of which is the number of component carriers in the PDCCH active component carrier set corresponding to the next level of the user equipment, from the downlink component carrier set as the PDCCH active component carrier set, and perform the calculation again.

The PDCCH active carrier allocating unit 52 is configured to allocate the transmission modes to the respective component carriers in the downlink component carrier set according to the currently received channel quality information fed back from the user equipment, and to allocate the transmission modes to the respective component carriers in the uplink component carrier set according to uplink channel quality information currently measured by the user equipment.

The PDCCH active carrier allocating unit 52 is configured to determine a downlink carrier scheduling mode of the user equipment according to the currently received channel quality information fed back from the user equipment and current interference level information of the system.

The PDCCH active carrier allocating unit 52 is configured to determine the level of the user equipment according to the type information of the user equipment; and to determine the downlink carrier scheduling mode of the user equipment according to the determined level of the user equipment, the currently received channel quality information fed back from the user equipment and the current interference level information of the system.

The carrier allocating unit 51 is configured to acquire the type information of the user equipment by receiving an RRC message during an access of the user equipment.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory) in which computer useable program codes are contained.

The invention has been described in a flow chart and/or a block diagram of the method, device (system) and computer program product according to the embodiments of the invention. It shall be appreciated that respective flows and/or blocks in the flow chart and/or the block diagram and combinations of the flows and/or blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the embodiments of the invention, a base station can allocate a downlink component carrier set to a user equipment according to currently received channel quality information fed back from the user equipment, acquired type information of the user equipment and a service request of the user equipment, and then select at least one component carrier from the downlink component carrier set as a component carrier in a PDCCH active component carrier set according to bandwidth information of respective carriers in a system, the type information of the user equipment, the currently received channel quality information fed back from the user equipment, transmission modes allocated to respective component carriers in the downlink component carrier set, and a determined carrier scheduling mode of the user equipment, and the user equipment performs PDCCH blind detections in the PDCCH active component carrier set for a number of times which does not exceed the largest number of blind detections per sub-frame supported by the user equipment in the type information of the user equipment to thereby control the number of blind detections.

Furthermore, the level of the user equipment can be determined according to the type information of the user equipment, and the user equipment at a different level supports a corresponding different largest number of blind detections, so schemes of a PDCCH scheduling mode and a PDCCH active CC Set can be decided with further reference to the different level of the user equipment, thereby configuring downlink scheduling information of a system with carrier aggregation to control the number of blind detections in the system with multi-carrier aggregation.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for configuring downlink scheduling information, comprising:

allocating a downlink component carrier set and an uplink component carrier set to a user equipment transmitting a service request; and selecting at least one component carrier from the downlink component carrier set as a component carrier in a Physical Downlink Control Channel, PDCCH, active component carrier set according to bandwidth information of respective carriers in a system, acquired type information of the user equipment, currently received channel quality information fed back from the user equipment, transmission modes allocated to respective component carriers in the downlink component carrier set and the uplink component carrier set, and a determined carrier scheduling mode of the user equipment, wherein the user equipment performs PDCCH blind detections for uplink and downlink scheduling in the PDCCH active component carrier set for a number of times which does not exceed the largest number of blind detections per sub-frame supported by the user equipment in the type information of the user equipment.

2. The method according to claim 1, wherein selecting at least one component carrier from the downlink component carrier set as a component carrier in the PDCCH active component carrier set comprises:

taking a number N of component carriers with the highest channel quality in the downlink component carrier set as component carriers in the PDCCH active component carrier set;

determining a downlink carrier scheduling mode of the user equipment and the number of component carriers comprised in the PDCCH active component carrier set according to the bandwidth information of the respective carriers in the system, the type information of the user equipment, the currently received channel quality information fed back from the user equipment, and the transmission modes allocated to the respective component carriers in the downlink component carrier set, and determining an uplink carrier scheduling mode of the user equipment according to the bandwidth information of the respective uplink carriers in the system, the type information of the user equipment, a currently received uplink channel measurement result of the user equipment, and the transmission modes allocated to the respective component carriers in the uplink component carrier set; and calculating the number of PDCCH blind detections performed by the user equipment for uplink and downlink scheduling in the PDCCH active component carrier set, determining whether the number of PDCCH blind detections exceeds the largest number of blind detections per sub-frame supported by the user equipment in the type information of the user equipment, and if not, allocating the PDCCH active component carrier set to the user equipment; otherwise, selecting a number N-M of component carriers from the downlink component carrier set as component carriers in a PDCCH active component carrier set, and continuing with the calculation, wherein N is a natural number and not larger than the number of component carriers in the downlink component carrier set, and M is a smaller natural number than N.

3. The method according to claim 2, wherein M is a fixed value preset for all the user equipments or a value preset for the largest number of blind detections per sub-frame supported by the user equipment.

4. The method according to claim 1, wherein selecting at least one component carrier from the downlink component carrier set as a component carrier in the PDCCH active component carrier set comprises:

determining a level of the user equipment according to the type information of the user equipment, and acquiring the number of downlink component carriers corresponding to the determined level of the user equipment according to a preset correspondence relationship between the levels of the user equipment and the supported largest numbers of downlink component carriers;

selecting downlink component carriers, the number of which is smaller than the largest number of downlink component carriers, from the downlink component carrier set;

determining the carrier scheduling mode of the user equipment and the number of component carriers comprised in the PDCCH active component carrier set according to the bandwidth information of the respective carriers in the system, the type information of the user equipment, the currently received channel quality information fed back from the user equipment, and the transmission modes allocated to the respective component carriers in the downlink component carrier set, and determining an uplink carrier scheduling mode of the user equipment according to the bandwidth information of the respective uplink carriers in the system, the type information of the user equipment, a currently received uplink channel measurement result of the user equipment, the number of component carriers comprised in the PDCCH active component carrier set, and the transmission modes allocated to the respective component carriers in the uplink component carrier set; and calculating the number of PDCCH blind detections performed by the user equipment for uplink and downlink scheduling in the PDCCH active component carrier set, determining whether the number of PDCCH blind detections exceeds the largest number of blind detections per sub-frame supported by the user equipment in the type information of the user equipment, and if not, allocating the PDCCH active component carrier set to the user equipment; otherwise, selecting component carriers, the number of which is the number of component carriers in the PDCCH active component carrier set corresponding to the next level of the user equipment, from the downlink component carrier set as the PDCCH active component carrier set, and continuing with the calculation.

5. The method according to claim 1, wherein the transmission modes are allocated to the respective component carriers in the downlink component carrier set according to the currently received channel quality information fed back from the user equipment; and the transmission modes are allocated to the respective component carriers in the uplink component carrier set according to uplink channel quality information currently measured by the user equipment.

6. The method according to claim 1, wherein a downlink carrier scheduling mode of the user equipment is determined according to the currently received channel quality information fed back from the user equipment and current interference level information of the system.

7. The method according to claim 6, wherein the downlink carrier scheduling mode of the user equipment is determined by:

determining a level of the user equipment according to the type information of the user equipment; and determining the downlink carrier scheduling mode of the user equipment according to the determined level of the user equipment, the currently received channel quality information fed back from the user equipment and the current interference level information of the system.

8. The method according to claim 1, wherein the type information of the user equipment is acquired by receiving a Radio Resource Control, RRC, message during an access of the user equipment.

9. A device for configuring downlink scheduling information, comprising:

a carrier allocating unit configured to allocate a downlink component carrier set and an uplink component carrier to a user equipment according to currently received channel quality information fed back from the user equipment, acquired type information of the user equipment and a service request of the user equipment; and a PDCCH active carrier allocating unit configured to select at least one component carrier from the downlink component carrier set as a component carrier in a PDCCH active component carrier set according to bandwidth information of respective carriers in a system, the acquired type information of the user equipment, the currently received channel quality information fed back from the user equipment, transmission modes allocated to respective component carriers in the downlink component carrier set and the uplink component carrier set, and a determined carrier scheduling mode of the user equipment, and the PDCCH active component carrier set is provided for the user equipment to perform PDCCH blind detections for uplink and downlink scheduling for a number of times which does not exceed the largest number of blind detections per sub-frame supported by the user equipment in the type information of the user equipment.

10. The device according to claim 9, wherein the PDCCH active carrier allocating unit is configured to take a number N of component carriers with the highest channel quality in the downlink component carrier set as component carriers in the PDCCH active component carrier set, wherein N is not larger than the number of component carriers in the downlink component carrier set; to determine a downlink carrier scheduling mode of the user equipment according to the bandwidth information of the respective carriers in the system, the type information of the user equipment, the currently received channel quality information fed back from the user equipment, and the transmission modes allocated to the respective component carriers in the downlink component carrier set; to determine an uplink carrier scheduling mode of the user equipment according to the bandwidth information of the respective uplink carriers in the system, the type information of the user equipment, a currently received uplink channel measurement result of the user equipment, the number of component carriers comprised in the PDCCH active component carrier set, and the transmission modes allocated to the respective component carriers in the uplink component carrier set; and to determine the number of component carriers comprised in the PDCCH active component carrier set, calculate the number of PDCCH blind detections performed by the user equipment for uplink and downlink scheduling in the PDCCH active component carrier set, determine whether the number of PDCCH blind detections exceeds the largest number of blind detections per sub-frame supported by the user equipment in the type information of the user equipment, and if not, allocate the PDCCH active component carrier set to the user equipment; otherwise, select a number N-M of component carriers from the downlink component carrier set as component carriers in a PDCCH active component carrier set, and perform the calculation again, wherein N is a natural number and not larger than the number of component carriers in the downlink component carrier set, and M is a smaller natural number than N.

11. The device according to claim 10, wherein M is a fixed value preset for all the user equipments or a value preset for the largest number of blind detections per sub-frame supported by the user equipment.

12. The device according to claim 9, wherein the PDCCH active carrier allocating unit is configured to determine a level of the user equipment according to the type information of the user equipment, and acquire the number of downlink component carriers corresponding to the determined level of the user equipment according to a preset correspondence relationship between the levels of the user equipment and the supported largest numbers of downlink component carriers; to select downlink component carriers, the number of which is smaller than the largest number of downlink component carriers, from the downlink component carrier set; to determine the carrier scheduling mode of the user equipment and the number of component carriers comprised in the PDCCH active component carrier set according to the bandwidth information of the respective carriers in the system, the type information of the user equipment, the currently received channel quality information fed back from the user equipment, and the transmission modes allocated to the respective component carriers in the downlink component carrier set, and determine an uplink carrier scheduling mode of the user equipment according to the bandwidth information of the respective uplink carriers in the system, the type information of the user equipment, a currently received uplink channel measurement result of the user equipment, the number of component carriers comprised in the PDCCH active component carrier set, and the transmission modes allocated to the respective component carriers in the uplink component carrier set; and calculate the number of blind detections performed by the user equipment in the PDCCH active component carrier set, determine whether the number of blind detections exceeds the largest number of blind detections per sub-frame supported by the user equipment in the type information of the user equipment, and if not, allocate the PDCCH active component carrier set to the user equipment; otherwise, select component carriers, the number of which is the number of component carriers in the PDCCH active component carrier set corresponding to the next level of the user equipment, from the downlink component carrier set as a PDCCH active component carrier set, and perform the calculation again.

13. The device according to claim 9, wherein the PDCCH active carrier allocating unit is configured to allocate the transmission modes to the respective component carriers in the downlink component carrier set according to the currently received channel quality information fed back from the user equipment, and to allocate the transmission modes to the respective component carriers in the uplink component carrier set according to uplink channel quality information currently measured by the user equipment.

14. The device according to claim 9, wherein the PDCCH active carrier allocating unit is configured to determine a downlink carrier scheduling mode of the user equipment according to the currently received channel quality information fed back from the user equipment and current interference level information of the system.

15. The device according to claim 14, wherein the PDCCH active carrier allocating unit is configured to determine a level of the user equipment according to the type information of the user equipment; and determine the downlink carrier scheduling mode of the user equipment according to the determined level of the user equipment, the currently received channel quality information fed back from the user equipment and the current interference level information of the system.

16. The device according to claim 14, wherein the carrier allocating unit is configured to acquire the type information of the user equipment by receiving an RRC message during an access of the user equipment.

* * * * *